(12) United States Patent
Kimura (10) Patent No.: US 10,581,353 B2
(45) Date of Patent: Mar. 3, 2020

(54) MOTOR DRIVE CONTROL DEVICE AND MOTOR DRIVE CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hideki Kimura, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 41 days.

(21) Appl. No.: 15/908,821

(22) Filed: Mar. 1, 2018

(65) Prior Publication Data

US 2019/0081581 A1     Mar. 14, 2019

(30) Foreign Application Priority Data

Sep. 14, 2017   (JP) ................................ 2017-176269

(51) Int. Cl.
*H02P 8/12*     (2006.01)
*H02P 8/34*     (2006.01)

(52) U.S. Cl.
CPC . *H02P 8/12* (2013.01); *H02P 8/34* (2013.01)

(58) Field of Classification Search
CPC ...................................... H02P 8/12; H02P 8/34
USPC .......................................................... 318/696
See application file for complete search history.

(56) References Cited

U.S. PATENT DOCUMENTS

| 9,035,592 B2 | 5/2015 | Gu |
| 9,871,485 B2 | 1/2018 | Kimura et al. |
| 2016/0352271 A1* | 12/2016 | Kimura ..................... H02P 8/18 |
| 2017/0373622 A1* | 12/2017 | Hijikata .................. H02P 29/40 |

FOREIGN PATENT DOCUMENTS

| JP | 5413904 B2 | 2/2014 |
| JP | 5665153 B2 | 2/2015 |
| JP | 5808943 B2 | 11/2015 |
| JP | 2016-220469 A | 12/2016 |

* cited by examiner

*Primary Examiner* — Kawing Chan
(74) *Attorney, Agent, or Firm* — Kim & Stewart LLP (57) ABSTRACT

A motor drive control device includes a PWM circuit configured to generate an excitation current for a motor, a measurement circuit configured to measure a charge duty of the excitation current, an arithmetic circuit configured to obtain a characteristic line from the change of the measured duty and calculate a predetermined division point of an excitation current waveform from the characteristic line, and a setting circuit configured to set a level of the excitation current at the division point.

20 Claims, 7 Drawing Sheets

MOTOR DRIVE CONTROL DEVICE AND MOTOR DRIVE CONTROL METHOD

CROSS-REFERENCE TO RELATED APPLICATION

This application is based upon and claims the benefit of priority from Japanese Patent Application No. 2017-176269, filed Sep. 14, 2017, the entire contents of which are incorporated herein by reference.

FIELD

Embodiments described herein relate generally to a motor drive control device and a motor drive control method.

BACKGROUND

In the related art, a motor drive control is performed in which an excitation current based on an excitation waveform pattern of a pseudo sine wave is supplied to an excitation coil to generate a magnetic field and a rotor is rotated by the generated magnetic field. When the excitation waveform pattern of the pseudo sine wave is set to a pseudo sine wave, noise can be reduced, for example.

Attempts have been made to generate an excitation waveform pattern of a pseudo sine wave from an excitation waveform of 2-phase excitation using a digital PLL (Phase Locked Loop), but the system becomes complicated. Therefore, it is desirable to provide a motor drive control device and a motor drive control method that can easily generate the excitation waveform pattern of the pseudo sine wave and can easily change the excitation waveform pattern depending on a drive state of a motor.

DETAILED DESCRIPTION

Embodiments provide a motor drive control device and a motor drive control method that can easily generate an excitation waveform pattern of a pseudo sine wave.

In general, according to one embodiment, a motor drive control device includes a PWM circuit configured to generate an excitation current for a motor, a measurement circuit configured to measure a charge duty of the excitation current, an arithmetic circuit configured to obtain a characteristic line from the change of the measured duty and calculates a predetermined division point of an excitation current waveform from the characteristic line, and a setting circuit configured to set a level of the excitation current at the division point.

Hereinafter, a motor drive control device and a motor drive control method according to an embodiment will be described with reference to the drawings. Incidentally, the present disclosure is not limited by the embodiments.

First Embodiment

Figure 1:
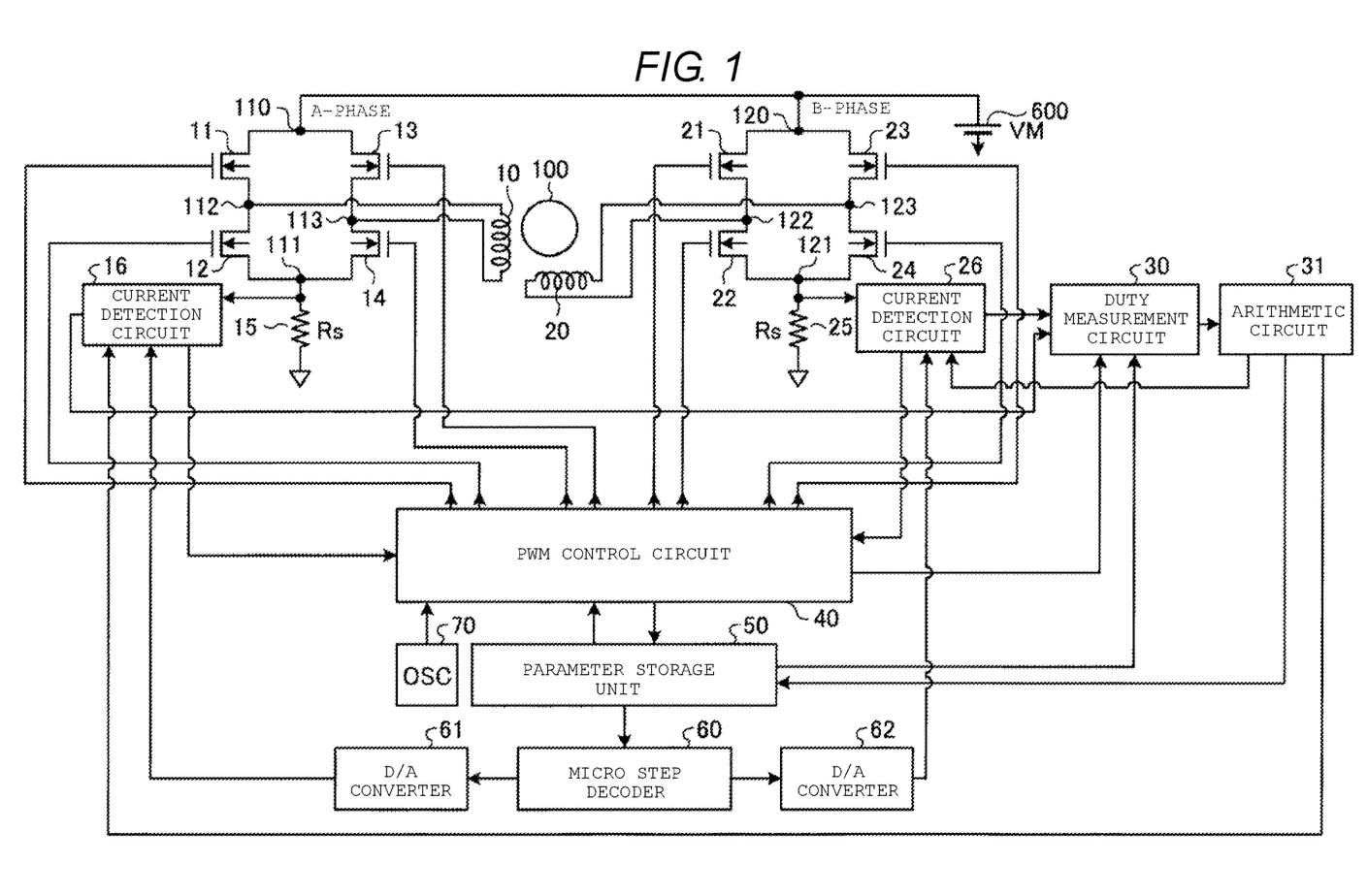
FIG. 1 is a diagram illustrating a configuration of a motor drive control device according to an embodiment.

FIG. 1 is a view illustrating a configuration of a motor drive control device according to a first embodiment. In the first embodiment, the motor drive control device includes an H-bridge circuit on a first phase (A-phase) side, an H-bridge circuit on a second phase (B-phase) side, a resistor 15, a resistor 25, a current detection circuit 16, a current detection circuit 26, a duty measurement circuit 30, an arithmetic circuit 31, a PWM (Pulse Width Modulation) control circuit 40, a parameter storage unit 50, a micro step decoder 60, a D/A converter 61, a D/A converter 62, and an oscillator (OSC) 70. The H-bridge circuit on the first phase (A-phase) includes four NchMOS transistors 11 to 14. A drain of the NchMOS transistor 11 and a drain of the NchMOS transistor 13 are connected to each other at a connection point 110. A voltage source 600 for supplying a voltage VM is connected to the connection point 110.

A source of the NchMOS transistor 12 and a source of the NchMOS transistor 14 are connected to each other at a connection point 111. The resistor 15 for current detection is connected between the connection point 111 and the ground. The resistor 15 has a resistance value Rs. A source of the NchMOS transistor 11 and a drain of the NchMOS transistor 12 are connected to each other at a connection point 112. A source of the NchMOS transistor 13 and a drain of the NchMOS transistor 14 are connected to each other at a connection point 113. The connection point 112 is connected to one end of an excitation coil 10, and the connection point 113 is connected to the other end of the excitation coil 10.

One end (on the side of the connection point 111) of the resistor 15 is connected to the current detection circuit 16. The current detection circuit 16 detects a current flowing through the resistor 15. An output of the current detection circuit 16 is supplied to the duty measurement circuit 30.

The H-bridge circuit on the second phase (B-phase) includes four NchMOS transistors 21 to 24. A drain of the NchMOS transistor 21 and a drain of the NchMOS transistor 23 are connected to each other at a connection point 120. The voltage source 600 for supplying the voltage VM is connected to the connection point 120.

A source of the NchMOS transistor 22 and a source of the NchMOS transistor 24 are connected to each other at a connection point 121. The resistor 25 for current detection is connected between the connection point 121 and the ground. The resistor 25 has a resistance value Rs. A source of the NchMOS transistor 21 and a drain of the NchMOS transistor 22 are connected to each other at a connection point 122. A source of the NchMOS transistor 23 and a drain of the NchMOS transistor 24 are connected to each other at a connection point 123. The connection point 122 is connected to one end of an excitation coil 20, and the connection point 123 is connected to the other end of the excitation coil 20. A rotor 100 is controlled by a magnetic field generated by the excitation coil 10 and the excitation coil 20. A motor includes the excitation coil 10, the excitation coil 20, and the rotor 100.

One end (on the side of the connection point 121) of the resistor 25 is connected to the current detection circuit 26.

The current detection circuit 26 detects a current flowing through the resistor 25. An output of the current detection circuit 26 is supplied to the duty measurement circuit 30.

The duty measurement circuit 30 measures a "duty of excitation current" flowing through the excitation coils 10 and 20 of the motor. The "duty of excitation current" referred to here may mean a time from the excitation start until the excitation current reaches a predetermined value. The "duty of excitation current" will be further described below.

Measurement results of the duty measurement circuit 30 are supplied to the arithmetic circuit 31. The arithmetic circuit 31 performs an arithmetic operation using the duty value of the excitation current measured by the duty measurement circuit 30, and calculates a parameter for generating a predetermined excitation waveform pattern. For example, the arithmetic circuit 31 calculates a parameter for generating W1-2-phase excitation waveform or 2W1-2-phase excitation waveform in addition to 1-2-phase excitation waveform from 2-phase excitation waveform.

Results of the arithmetic operation of the arithmetic circuit 31 are supplied to the parameter storage unit 50. The parameter storage unit 50 stores parameter values for generating various excitation waveform patterns. For example, the parameter storage unit 50 stores a parameter value for generating an excitation waveform pattern of a pseudo sine waveform. The parameter storage unit 50 may be implemented by, for example, a rewritable flash memory. In addition, the stored parameter value specifies, for example, a duty of a PWM signal generated by the PWM control circuit 40.

The parameter values of the parameter storage unit 50 are supplied to the micro step decoder 60. The micro step decoder 60 generates a signal for generating a micro-step excitation waveform based on the parameters supplied from the parameter storage unit 50.

The signal from the micro step decoder 60 is supplied to the D/A converter 61 and the D/A converter 62. The D/A converter 61 sets a current detection level of the current detection circuit 16 in response to the signal from the micro step decoder 60. That is, the D/A converter 61 adjusts a step of a micro-step excitation waveform. Similarly, the D/A converter 62 sets a current detection level of the current detection circuit 26 in response to the signal from the micro step decoder 60, and adjusts a step of a micro-step excitation current pattern.

An output signal of the oscillator (OSC) 70 is supplied to the PWM control circuit 40. The oscillator 70 generates a chop signal for controlling the start of charging and supplies the signal to the PWM control circuit 40.

The PWM signal is supplied from the PWM control circuit 40 to gates of the NchMOS transistors 11 to 14 and gates of the NchMOS transistors 21 to 24 constituting the respective bridge circuits. The PWM signal supplied from the PWM: control circuit 40 controls an ON/OFF of the respective NchMOS transistors 11 to 14 and the respective NchMOS transistors 21 to 24 constituting the respective H-bridge circuits. The excitation current flowing through the excitation coil 10 and the excitation coil 20 is controlled by the ON/OFF of the respective NchMOS transistors. For example, a PWM signal whose duty is controlled according to an excitation waveform pattern of a pseudo sine waveform is supplied to the respective NchMOS transistors 11 to 14 and the respective NchMOS transistors 21 to 24.

According to the first embodiment, the current detection circuit 16 detects the current flowing through the resistor 15 connected to the H-bridge circuit constituted with the Nch-MOS transistors 11 to 14 and the duty of the excitation current flowing through the excitation coil 10 is measured. Further, the current detection circuit 26 detects the current flowing through the resistor 25 connected to the H-bridge circuit constituted with the NchMOS transistors 21 to 24 and the duty of the excitation current flowing through the excitation coil 20 is measured. Using the measured duty value of the excitation current, the arithmetic circuit 31 calculates the parameter for generating a predetermined excitation waveform pattern. For example, the arithmetic circuit 31 calculates the parameter for changing the excitation waveform pattern of the square wave to the micro-step waveform, based on the calculated parameter. For example, a division point is set at which the square wave is divided into the pseudo sine wave.

The micro step decoder 60 (setting circuit) generates the signal for generating the micro-step excitation waveform in response to the output of the arithmetic circuit 31. For example, the micro step decoder 60 sets a level of the excitation current at the division point at which the square wave is divided. The division point of the square wave and the setting level of the excitation current at the division point are adjusted, so that the excitation waveform pattern of the pseudo sine wave can be automatically generated.

Figure 2:
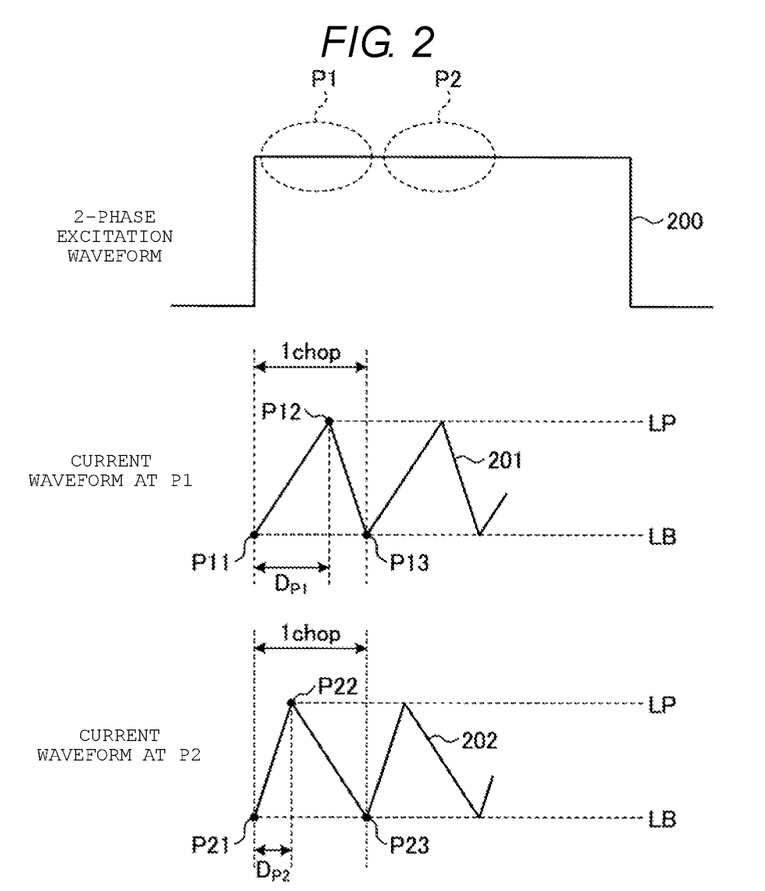
FIG. 2 is a diagram for explaining a relation between a 2-phase excitation waveform and a change in duty of an excitation current.

FIG. 2 is a diagram for explaining a relation between the excitation waveform and the change in duty of the excitation current. For example, observation is made on the motor drive control device of the first embodiment in FIG. 1.

In FIG. 2, an upper part illustrates a 2-phase excitation waveform 200. A middle part illustrates an excitation current 201 in the range indicated by a dotted line P1 of the excitation waveform 200. A lower part illustrates an excitation current 202 in the range indicated by a dotted line P2 of the excitation waveform 200.

The excitation currents 201 and 202 change between a lower-limit level LB and an upper-limit set level LP. Start timings P11 and P21 of a charge operation of the excitation current are controlled by the chop signal of the oscillator 70 described above. The lower-limit level LB indicates an excitation current value at start timings P11, P13, P21, and P23 at which the excitation current starts to be charged in response to the chop signal of the oscillator 70, and the upper-limit set level LP indicates a value which is set as an upper-limit value of the excitation current.

At time points P12 and P22 when the excitation currents 201 and 202 reach the upper-limit set level LP, the discharge operation is performed. That is, for example, the charge operation of turning on the NchMOS transistors 11 and 14 constituting the H-bridge circuit on the A-phase side in FIG. 1 is shifted to the discharge operation of turning on the NchMOS transistors 12 and 13. The timing at which the excitation currents 201 and 202 reach the upper-limit set level LP can be detected by the current detection circuits 16 and 26.

The duty of the excitation current is defined as a ratio of a 1chop period determined by the chop signal, that is, the period from P11 to P13 and a period DP1 from P11 to P12 which is the charge operation period. Similarly, the duty of the excitation current is defined as a ratio of the period from P21 to P23 and a period DP2 from P21 to P22 which is the charge operation period.

A difference is observed between the charge operation period DP1 of the excitation current in the range indicated by the dotted line P1 and the charge operation period DP2 of the excitation current in the range indicated by the dotted line P2. This is because it takes long time for the rising of the excitation waveform to reach the upper-limit set level LP, at which the excitation current is set as the predetermined set value, by an induced electromotive force.

Figure 3:
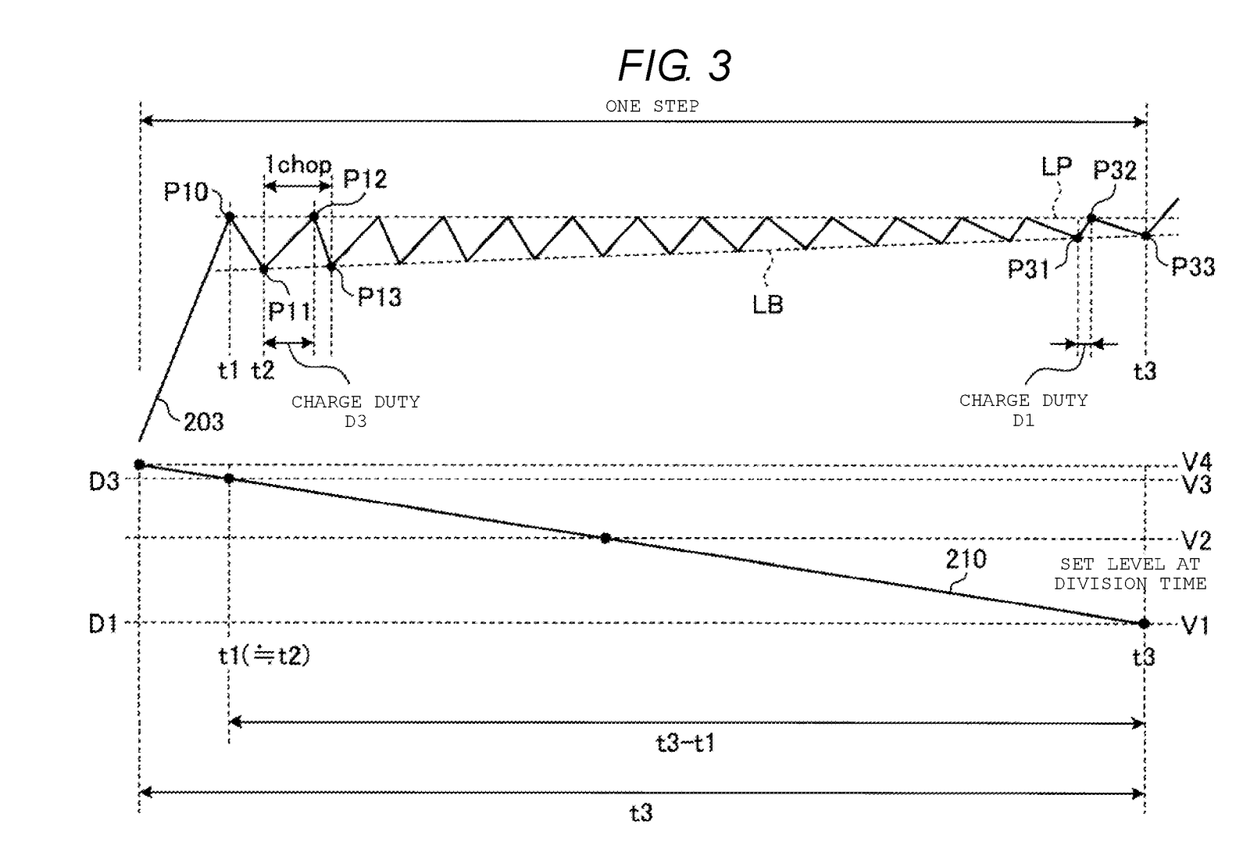
FIG. 3 is a diagram for explaining a temporal change between a micro-step excitation waveform and a duty.

FIG. 3 is a diagram for explaining a change in duty of the excitation current and a method of setting parameters for dividing the excitation waveform. One step of the micro-step excitation waveform pattern will be described as an example. The description will be made with respect to the motor drive control device of the first embodiment in FIG. 1.

The micro-step excitation waveform is controlled by, for example, a repetition of a switching operation into the discharge operation of turning on the NchMOS transistors 12 and 13 from the charge operation of turning on the NchMOS transistors 11 and 14 constituting the H-bridge on the A-phase side which supplies the excitation current to the excitation coil 10 in FIG. 1.

In FIG. 3, when the set level of the micro step is switched, the excitation current 203 reaches the upper-limit set level LP at a timing t1. P10 indicates a point at which the excitation current 203 reaches the upper-limit set level LP.

When the excitation current 203 reaches the upper-limit set level LP, the discharge operation is performed. Thus, the excitation current is reduced. Thereafter, the charge operation is performed in response to the chop signal supplied at a fixed timing, and the excitation current increases. At a point P12 at which the excitation current increases and the excitation current reaches the upper-limit set level LP, the discharge operation is performed again. Thus, the excitation current decreases. At a point P13, the charge operation starts again in response to the chop signal, and the excitation current increases. A constant current operation of repeating the charge operation and the discharge operation is performed.

The current detection circuits 16 and 26 detect the timing when the excitation current reaches the upper-limit set level LP.

FIG. 3 schematically illustrates the operation in which the excitation current repeats the charge operation and the discharge operation. This shows how timing changes from when the charge operation starts in response to the chop signal until the excitation current reaches the upper-limit set level LP. Here, the time from when the charge operation starts until the excitation current reaches the upper-limit set level LP is referred to as a charge duty for the sake of convenience.

Initially the charge duty is long. That is, as the step level of the micro step changes, the time to reach the upper-limit set level LP charge duty from the rising of the waveform until before the excitation current reaches the point P10 in the drawing initially is long. This is because an induced electromotive force initially is generated initially when the current set value is raised.

Conversely, in the latter half of one step, the time until the excitation current reaches the upper-limit set level LP becomes shorter, and the charge duty becomes smaller.

The change in charge duty can be grasped as a change proportional to a straight line 210 as illustrated in a lower part of FIG. 3.

The lower part of FIG. 3 illustrates charge duty plot for each timing. The horizontal axis represents a time t1 from when the upper-limit set level LP of the excitation current of the micro step changes until the excitation current initially reaches the set level LP and a time t3 at which one step ends.

Here, reference numeral D3 represents a charge duty in the initial 1chop period (starting from a timing t2 in FIG. 3) in which the constant current operation of repeating the charge operation and the discharge operation is performed after the excitation current initially reaches the upper-limit set level LP. A voltage level V3 is set corresponding to the duty D3. In FIG. 3, strictly speaking, there is a discharge period from the time t1 to the time t2, but the start time t2 of the initial 1chop period is assumed here to be approximately the time t1 for the sake of convenience.

At a 1chop period before one step ends, that is, a period from P31 to P33, a charge duty is measured. At this time, the measured charge duty is defined as D1. A voltage level V1 is set corresponding to the charge duty D1. The voltage levels V1 and V3 are parameters corresponding to the charge duties D1 and D3.

As illustrated in the lower part of FIG. 3, an initial voltage level V4 in the step can be obtained by adding the time t1 at which an initial charge duty is not measured, in correlation with the set voltage levels V1 and V3 and the timings t1 and t3 at that time.

That is, from a similar relation between a triangle in which a base is (t3-t1) and a height of one side is (V3-V1) and a triangle in which a base is t3 and a height of one side is (V4-V1), the voltage level V4 can be obtained.

That is, the voltage level V4 can be obtained by the following equation (1).

$$V4 = \frac{t3}{t3-t1} \times (V3 - V1) + V1 \quad [\text{Equation 1}]$$

The voltage level V4 is the set level at the timing at which one step starts. Thus, for example, a voltage level V2 at the midpoint of one step can be obtained as a value of (V4-V1)/2. That is, the timing when the excitation current reaches the voltage level V2 can be a timing at which one step of the micro step is divided or a rectangular excitation waveform of 2-phase excitation is divided.

Detection levels of the current detection circuits 16 and 26 are set in correlation with the voltage level V2, and thus the excitation waveform can be automatically divided. For the excitation waveform after division, for example, the upper-limit set level LP of the excitation current is set to 100%, and the set level at the division time is set to 71%.

At the range in which the excitation current decreases, that is, a set level of an electrical angle from 90° C. to 180° C., the increase/decrease of the charge duty is inverted. Therefore, it can be obtained by creating a parameter whose charge duty decreases with the lapse of time. An electrical angle from 180° C. to 360° C. can be created by inversion of the parameter created at the electrical angle from 0° C. to 180° C.

Figure 4:
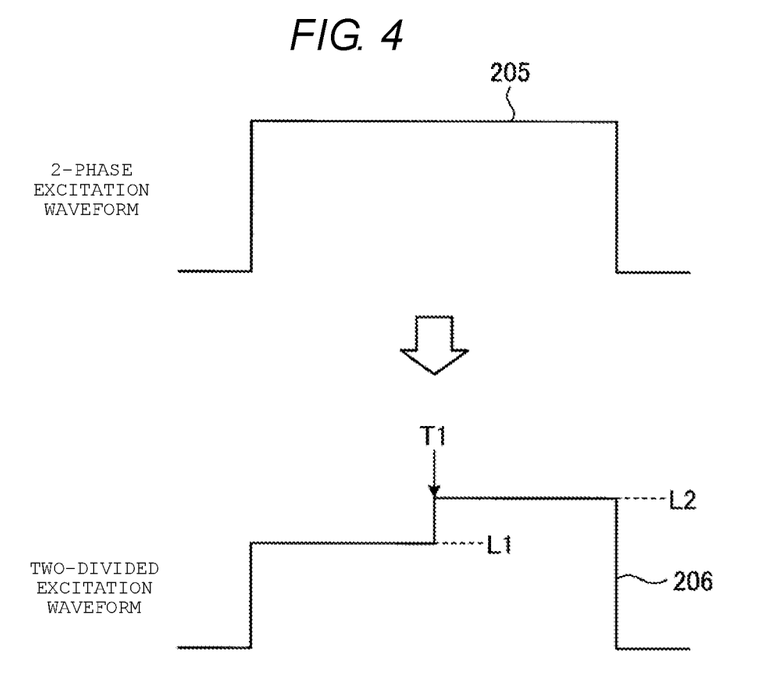
FIG. 4 is a diagram illustrating an example of division of a 2-phase excitation waveform.

FIG. 4 is a diagram schematically illustrating an example in a case where the 2-phase excitation waveform is divided into two parts. An example is illustrated in which a 2-phase excitation waveform 205 is divided at a timing T1 of the two-divided voltage level V2 described above. In an excitation waveform 206 after division into two parts, a set level L1 of the excitation current at the division timing T1 is set to 71% of the upper-limit value L2.

A value of the set level L1 at the division timing T1 can be set using a relational expression of $(\sin \theta)^2 + (\cos \theta)^2 = 1$, where $\theta$ is the electrical angle at the division point.

Figure 5:
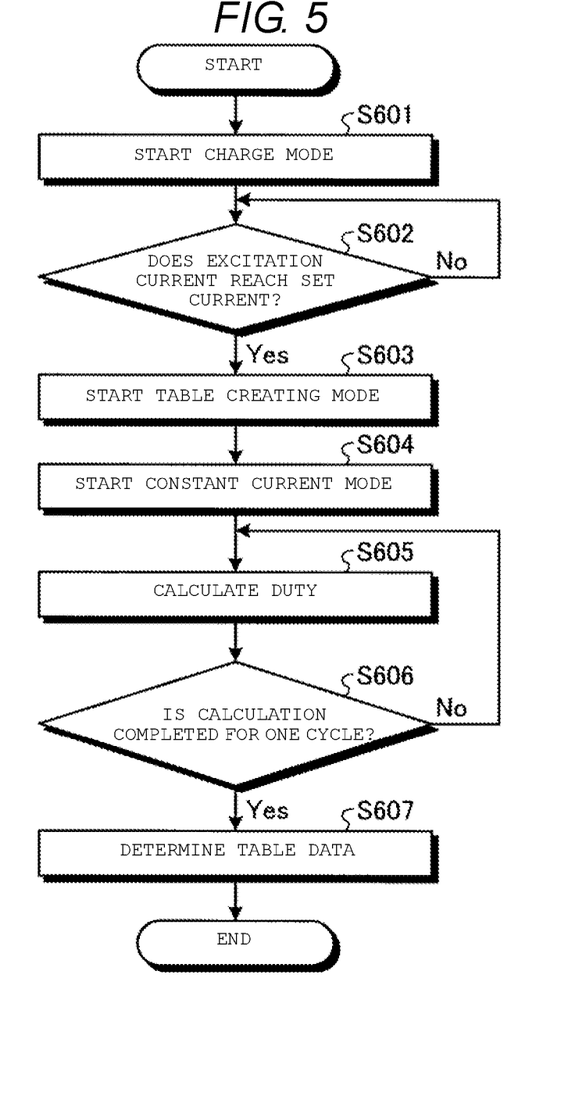
FIG. 5 is a flowchart illustrating an example of a motor drive control method.

FIG. 5 is a flowchart illustrating an example of a motor drive control method. The flow of the control method is implemented in the motor drive control device of the first embodiment.

A charge mode is started, which initiates supply of the excitation current (S601).

The excitation current reaches a predetermined set current (S602). This is detected by the current detection circuits 16 and 26 of the first embodiment in FIG. 1. A voltage drop is detected in the resistors 15 and 25 through which the excitation current flows, and thus the magnitude of the excitation current can be detected.

When the excitation current reaches the set current value (S602: Yes), a table creating mode is started (S603). For example, the time t1 when the excitation current reaches the predetermined set current value is registered in the table. If the excitation current does not reach the set current value (S602: No), then the charge operation is continued.

After the excitation current reaches the set current value, a constant current mode is started (S604). The constant current mode for example is started as a repeated operation of turning on the NchMOS transistor 11 and the NchMOS transistor 14 constituting the H-bridge on the A-phase side illustrated in FIG. 1 to supply the excitation current to the excitation coil 10 and the discharge operation of turning on the NchMOS transistor 12 and the NchMOS transistor 13.

The duty of the excitation current is calculated (S605). That is, the ratio of the time until the excitation current reaches the predetermined set current value from the start of the charge operation in response to the chop signal. From this, the 1chop period is calculated.

It is determined whether the duty of the excitation current is calculated for one cycle (S606). In this case, the one cycle can be set as a period from when the level of one step is set and the charge starts until the step is completed, for example, in the case of the micro step.

When the measurement of the duty of the excitation current is completed for one cycle (S606: Yes), table data is determined (S607). See FIG. 3, which shows the temporal change between the excitation waveform and the duty of the excitation current. Parameters, such as for example, the respective timings t1 and t3, the charge duties D1 and D3 at the respective timings, the corresponding voltage levels V1 and V3, and the calculated V4, and the V2 set as the voltage level of the division point are registered. Each of the parameters is registered in the parameter storage unit 50, for example. When the measurement of the duty of the excitation current is not completed for one cycle (S606: No), the duty is continuously calculated.

After the voltage levels V1 and V4 are set, the two-divided voltage level V2 can be calculated as well as a voltage level at any division point. For example, it is possible to calculate voltage levels at division points corresponding to ¼ and ¾ with respect to the straight line 210 illustrated in the lower part of FIG. 3.

Further, a duty of an excitation current corresponding to the voltage level at any division point can also be used as a parameter for specifying the division point of the excitation waveform. That is, it is also possible to detect the duty of the excitation current and to carry out control to set the time point where a predetermined duty is reached to the division point of the excitation waveform.

Figure 6A:
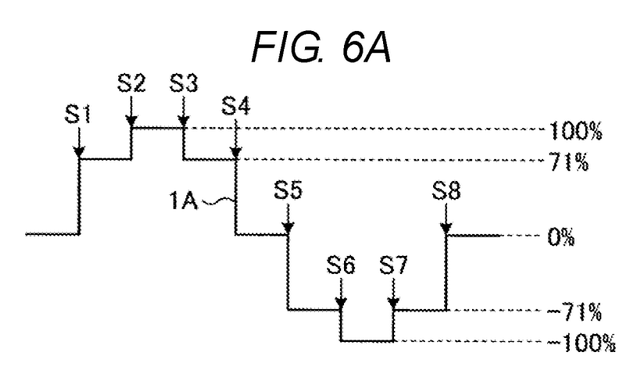
FIGS. 6A and 6B are diagrams illustrating excitation waveforms in the case of 1-2-phase excitation.
Figure 6B:
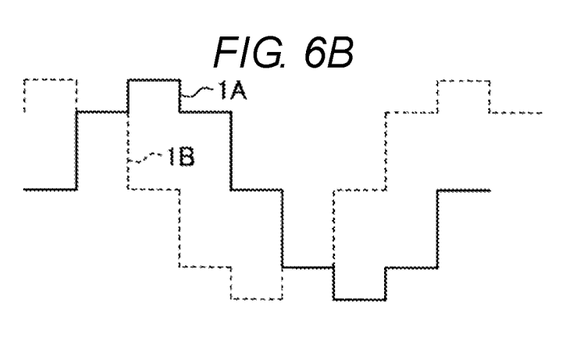

FIGS. 6A and 6B are diagrams illustrating excitation waveforms in the case of 1-2-phase excitation. FIG. 6A illustrates an excitation waveform 1A of an A-phase. S1 to S8 indicate division points of the excitation waveform in the case of the 1-2-phase excitation. A set level at the timing S1, at which the excitation current increases, is set to 71% with respect to the upper-limit value (100%).

Parameters of the electrical angle from 0° C. to 90° C. can be used for the electrical angle from 90° C. to 180° C. where the excitation current decreases. That is, each parameter can be used as a line-symmetric relation with the electrical angle of 90° C. In addition, parameters of the electrical angle from 0° C. to 180° C. can be inversely used for the electrical angle from 180° C. to 360° C.

When the change in duty of the excitation current is detected and thus the division point of the excitation waveform is set, it is possible to automatically generate an excitation waveform pattern of the 1-2-phase excitation from a square wave of 2-phase excitation. FIG. 6B illustrates a relation between phases of the excitation waveform 1A of the A-phase and an excitation waveform 1B of a B-phase in the case of the 1-2-phase excitation.

Figure 7A:
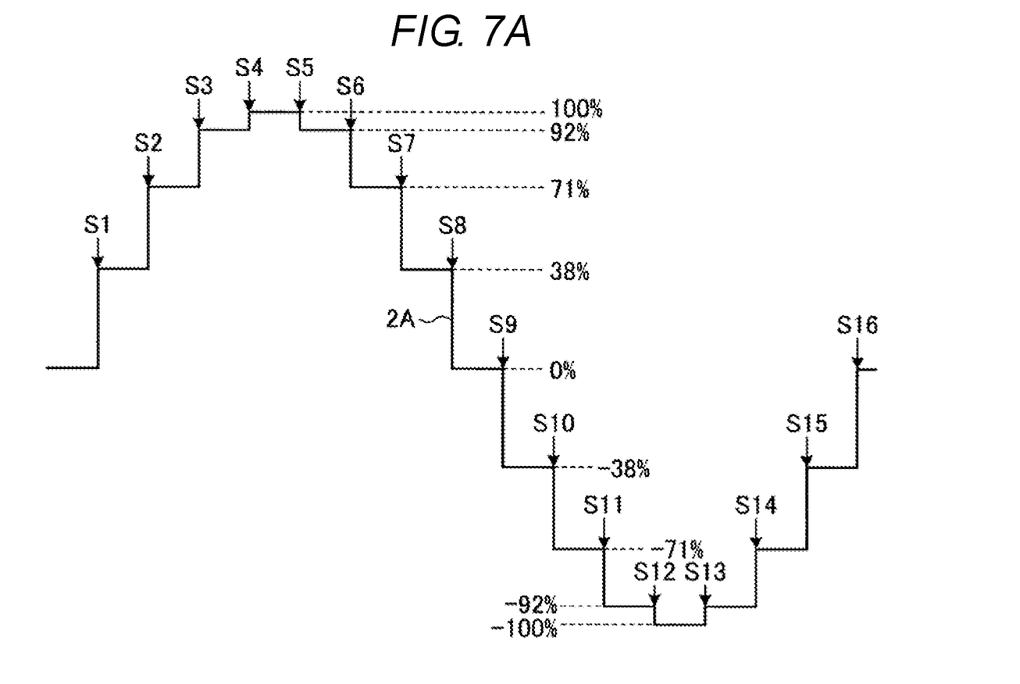
FIGS. 7A and 7B are diagrams illustrating excitation waveforms in the case of W1-2-phase excitation.
Figure 7B:
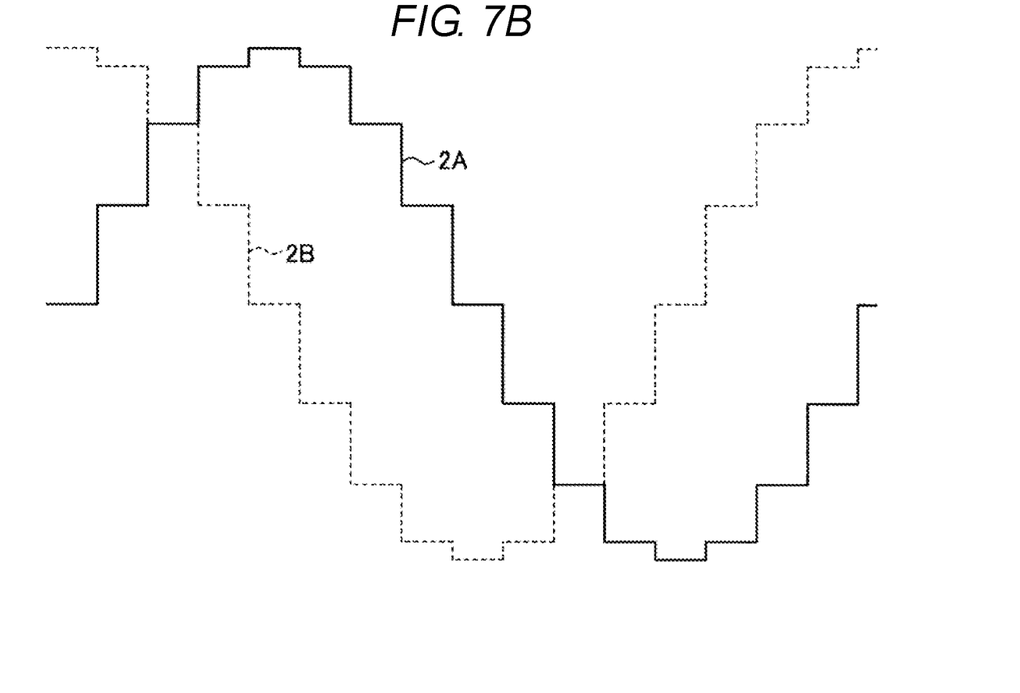

FIGS. 7A and 7B are diagrams for explaining an excitation waveform in the case of W1-2-phase excitation. FIG. 7A illustrates an excitation waveform 2A of an A-phase. S1 to S6 indicate division points of the excitation waveform in the case of the W1-2-phase excitation.

A set level at the timing S1, at which the excitation current increases, is set to 38%, a set level at the timing S2 is set to 71%, and a set level at the timing S3 is set to 92%. Parameters of the electrical angle from 0° C. to 90° C. can be used for the electrical angle from 90° C. to 180° C. where the excitation current decreases.

That is, a set level at the timing S6 can be provided in correlation with the timing S3, and set levels at the timings S7 and S8 can be provided using parameters corresponding to the timings S2 and S1, respectively. Further, parameters of the electrical angle from 0° C. to 180° C. can be inversely used for the electrical angle from 180° C. to 360° C. FIG. 7B illustrates a relation between phases of the excitation waveform 2A of the A-phase and an excitation waveform 2B of a B-phase in the case of the W1-2-phase excitation.

The duty of the excitation current changes depending on the drive state of the motor. Therefore, when the operation of the motor is stable, the excitation current is divided, that is, the square wave is divided, thereby being changed into a waveform close to a sine wave. Then, when the operation state is unstable, excitation current may be controlled back to the square wave. This is because the square wave is stable in terms of signal.

For example, when the drive state of the motor is stable, the square wave is divided to be close to the sine wave, and the W1-2-phase excitation is performed in addition to the 1-2-phase excitation. When the drive state of the motor is unstable, it is possible to control to return from the W1-2-phase excitation to the 1-2-phase excitation and the 2-phase excitation.

Further, since the division timing of the excitation current is correlated with the change in duty, it is possible to perform control which is hardly influenced by fluctuation of the operation speed of the motor with the time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor drive control device comprising:
   a PWM circuit configured to generate an excitation current for a motor;
   a measurement circuit configured to measure a plurality of charge duties of the excitation current;

an arithmetic circuit configured to obtain a characteristic line from the change of the measured duties and calculate a level of the excitation current at a predetermined division point from the characteristic line; and a setting circuit configured to set the excitation current at the predetermined division point to be at the calculated level, wherein the PWM circuit generates the excitation current at the division point based on the set level of the excitation current.

2. The motor drive control device according to claim 1, wherein the measurement circuit is configured to measure each of the charge duties from a change in voltage across in a resistor to which the excitation current is supplied.

3. The motor drive control device according to claim 1, further comprising:

an oscillating circuit configured to generate a control signal for control of a rising timing of the excitation current.

4. The motor drive control device according to claim 1, wherein the motor is a stepper motor, and the excitation current has a pattern selected from any one of 2-phase excitation, 1-2-phase excitation, W1-2-phase excitation, and 2W1-2-phase excitation.

5. The motor drive control device according to claim 1, wherein multiple excitation current levels of the excitation current at multiple division points are calculated for the PWM circuit to generate a modified sine wave current.

6. The motor drive control device according to claim 1, further comprising:

a parameter storage circuit that stores multiple excitation levels of the excitation current at multiple division points that are calculated for the PWM circuit to generate a modified sine wave current.

7. The motor drive control device according to claim 1, wherein, when the motor is unstable, the PWM circuit generates a square wave current.

8. The motor drive control device according to claim 1, wherein the motor comprises two excitation coils and two measurement circuits, and the two measurement circuits each measure charge duties of the excitation current that flows in the corresponding excitation coil.

9. The motor drive control device of claim 8, wherein multiple excitation current levels of the excitation current at multiple division points are calculated for the PWM circuit to generate a modified sine wave current.

10. The motor drive control device according to claim 1, wherein the measured charge duties decrease during an applied pulse to the motor.

11. A motor drive control method comprising:
generating an excitation current for a motor;
measuring a plurality of charge duties of the excitation current;
obtaining a characteristic line from the change of the measured charge duties;
calculating a level of the excitation current at a predetermined division point from the characteristic line; and
setting the excitation current at the predetermined division point to be at the calculated level, such that the excitation current at the division point is generated based on the set level of the excitation current.

12. The motor drive control method according to claim 11, further comprising:

obtaining a first parameter value and a second parameter value corresponding to the charge duties at the time of rising and falling of a waveform of the excitation current, from the characteristic line, wherein the level of the excitation current at the predetermined division point is calculated based on a difference between the first parameter value and the second parameter value.

13. The motor drive control method according to claim 11, wherein the step of measuring a plurality of charge duties includes measuring a voltage across a resistor to which the excitation current is supplied.

14. The motor drive control method according to claim 11, wherein the charge duties are measured by a duty measurement circuit.

15. The motor drive control method according to claim 11, wherein the step of obtaining a characteristic line includes determining a first voltage level corresponding to a charge duty in an initial pulse period of the excitation current and a second voltage level corresponding to a charge duty in a last pulse period of the excitation current.

16. The motor drive control method according to claim 11, wherein the excitation current is supplied to two motor excitation coils of the motor such that the excitation current has the calculated level at the predetermined division point.

17. The motor drive control method according to claim 11, wherein the step of calculating a level of the excitation current further includes storing the calculated level of the excitation current in a parameter storage unit.

18. The motor drive control method according to claim 11, wherein multiple excitation current levels of the excitation current at multiple division points are calculated for generating a pseudo sine wave current.

19. The motor drive control method according to claim 18, wherein when the operation of the motor is unstable, a square wave current is generated as the excitation current.

20. A method for driving a stepper motor comprising an excitation coil and a PWM control circuit for driving the coil, the method comprising:

generating multiple successive excitation currents for generating a pseudo sine wave current for the excitation coil of the motor;

measuring a plurality of charge duties of the successive excitation currents;

determining a characteristic line from the change of the measured charge duties;

calculating a level of the excitation currents at a predetermined division point for the pseudo sine wave current from the determined characteristic line; and setting the excitation currents at the predetermined division point to be at the calculated level, such that the excitation currents at the division point are generated based on the set level of the excitation currents.

* * * * *